(12) United States Patent
Glugla et al.

(10) Patent No.: US 9,506,411 B2
(45) Date of Patent: Nov. 29, 2016

(54) IF METHOD AND SYSTEM FOR ENGINE KNOCK CONTROL

(71) Applicant: Ford Global Technologies, LLC, Dearborn, MI (US)

(72) Inventors: Chris Paul Glugla, Macomb, MI (US); Brad Alan VanDerWege, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 105 days.

(21) Appl. No.: 14/517,649

(22) Filed: Oct. 17, 2014

(65) Prior Publication Data

US 2016/0108828 A1    Apr. 21, 2016

(51) Int. Cl.

| | |
|---|---|
| *F02D 41/26* | (2006.01) |
| *F02D 35/02* | (2006.01) |
| *F02D 17/02* | (2006.01) |
| *F02D 37/02* | (2006.01) |
| *F02D 41/00* | (2006.01) |
| *F02P 5/152* | (2006.01) |
| *F02D 41/22* | (2006.01) |
| *F02P 5/04* | (2006.01) |

(52) U.S. Cl.
CPC ............ *F02D 35/027* (2013.01); *F02D 17/02* (2013.01); *F02D 35/025* (2013.01); *F02D 37/02* (2013.01); *F02D 41/0087* (2013.01); *F02P 5/1522* (2013.01); *F02D 41/22* (2013.01); *F02D 2041/0012* (2013.01); *F02P 5/045* (2013.01)

(58) Field of Classification Search
CPC ...... F02D 35/027; F02D 17/02; F02D 37/02; F02D 41/0087; F02D 13/06; F02D 2041/0012; F01L 13/0005; F01L 2013/001; F02P 5/045; F02P 5/1522
USPC ..... 123/198 F, 90.15, 481, 198 DB, 198 DC, 123/435, 436, 406.37, 406.55; 701/111, 701/112
See application file for complete search history.

(56) References Cited

U.S. PATENT DOCUMENTS

| | | | |
|---|---|---|---|
| 5,255,637 | A | 10/1993 | Schechter |
| 5,483,941 | A | 1/1996 | Cullen et al. |
| 5,775,298 | A | 7/1998 | Haller |
| 6,978,204 | B2 | 12/2005 | Surnilla et al. |
| 7,946,275 | B2 | 5/2011 | McDonald et al. |
| 8,272,362 | B2 | 9/2012 | Shane et al. |
| 8,651,091 | B2 | 2/2014 | Tripathi et al. |
| 2010/0263639 | A1 | 10/2010 | Uhrich et al. |
| 2013/0305718 | A1 | 11/2013 | Rollinger et al. |

FOREIGN PATENT DOCUMENTS

GB      2448686    *    2/2012   ............ F01L 13/00

OTHER PUBLICATIONS

Hilditch, James A. et al., "Systems and Methods for Exhaust Catalyst Temperature Control," U.S. Appl. No. 14/341,484, filed Jul. 25, 2014, 42 pages.

* cited by examiner

*Primary Examiner* — Hai Huynh
(74) *Attorney, Agent, or Firm* — Julia Voutyras; Alleman Hall McCoy Russell & Tuttle LLP

(57) ABSTRACT

Methods and systems are provided for using selective cylinder deactivation for knock control with reduced fuel penalty. Cylinders with heavier knock and/or more borderline limited spark may be transiently deactivated until they are sufficiently cool. While reactivating the cylinders following cooling, other cylinders that are knocking, hot, or borderline spark limited may be deactivated.

19 Claims, 4 Drawing Sheets

IF METHOD AND SYSTEM FOR ENGINE KNOCK CONTROL

FIELD

The present application relates to methods and systems for controlling knock events in an engine system configured to perform skip-fire combustion.

BACKGROUND AND SUMMARY

Spark ignited internal combustion engines can encounter abnormal combustion events, such as knock, under high load operation, especially when operating with lower octane fuels. In-cylinder temperatures may provide a significant indication as to whether a cylinder is likely to knock or not. In particular, hotter cylinders may have a larger tendency to knock. Further, based on an engine configuration, such as the location of cooling passages and engine packaging constraints, some cylinders may be more prone to knock that others. Knock may be addressed by retarding spark timing of engine cylinders. While spark retard improves knock, it results in lower engine torque output and reduced fuel economy.

In recent years, spark ignited combustion engines have been configured to operate with a variable number of active or deactivated cylinders to increase fuel economy, while optionally maintaining the overall exhaust mixture air-fuel ratio about stoichiometry. Such engines can vary the effective displacement of the engine by skipping the delivery of fuel to certain cylinders in an indexed cylinder firing pattern, also referred to as a "skip-fire" pattern. For example, as shown by Tripathi et al. in U.S. Pat. No. 8,651,091, an engine fuel controller may continuously rotate which particular cylinders are fueled, which cylinders are skipped, and how many cylinders events the pattern is continued for. By skipping feel delivery to selected cylinders, the active cylinders can be operated near their optimum efficiency, increasing the overall operating efficiency of the engine.

The inventors herein have recognized that the amount of spark retard applied for knock control (and thereby the fuel penalty associated with knock control) can be reduced by leveraging individual cylinder valve deactivation mechanisms. In particular, the fast responding cylinder valve deactivation mechanisms of skip-fire engines may be used to transiently deactivate cylinders with a higher knocking rate, the identity of the deactivated cylinder varied as the knock pattern of the cylinders change with engine operating conditions. One example approach includes, deactivating individual cylinder valve mechanisms according to a cylinder pattern selected based on a knock value of each engine cylinder. In this way, knock may be controlled with the use of less spark retard.

As an example, if a cylinder has been knocking frequently, a controller may selectively deactivate the given cylinder for one or more combustion events. The knocking cylinder may be deactivated by deactivating intake and exhaust valve operation of the cylinder while also disabling fuel and spark to the cylinder. For example, the cylinder may be deactivated when a knocking rate or occurrence in the cylinder exceeds a threshold. Alternatively, with each knock event, spark timing may be retarded away from a borderline value. Then, as the knock frequency increases and spark retard exceeds beyond a threshold (e.g., becomes borderline limited), the cylinder may be deactivated. Due to the deactivation, the cylinder may start cooling, reducing its propensity for further knock events. When the in-cylinder temperature falls below a threshold temperature, the cylinder may be reactivated. The cylinder may then be operated with less spark retard, for example, spark timing of the reactivated cylinder may be advanced towards MBT. Alternatively, as the engine cylinder cools and another engine cylinder becomes concurrently hotter, and more borderline spark limited, the more borderline limited cylinder may be deactivated while the cooled cylinder may be reactivated.

In this way, by adjusting a pattern of cylinder deactivation based on cylinder knock occurrence, engine knock can be controlled with the use of less spark retard. As a result, the fuel penalty associated with knock control can be reduced. By deactivating cylinders that have higher knock incidence until they are sufficiently cool, and then reactivating them, the cylinders may be operated with spark closer to MBT. By continually varying the pattern of deactivated/active cylinders such that cylinders are deactivated when they knock more and reactivated when they less, cylinder temperatures may be controlled reducing the propensity for further knock events. By operating active cylinders with spark advanced from borderline towards MBT, the engine may be operated with less knock occurrence and with higher fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
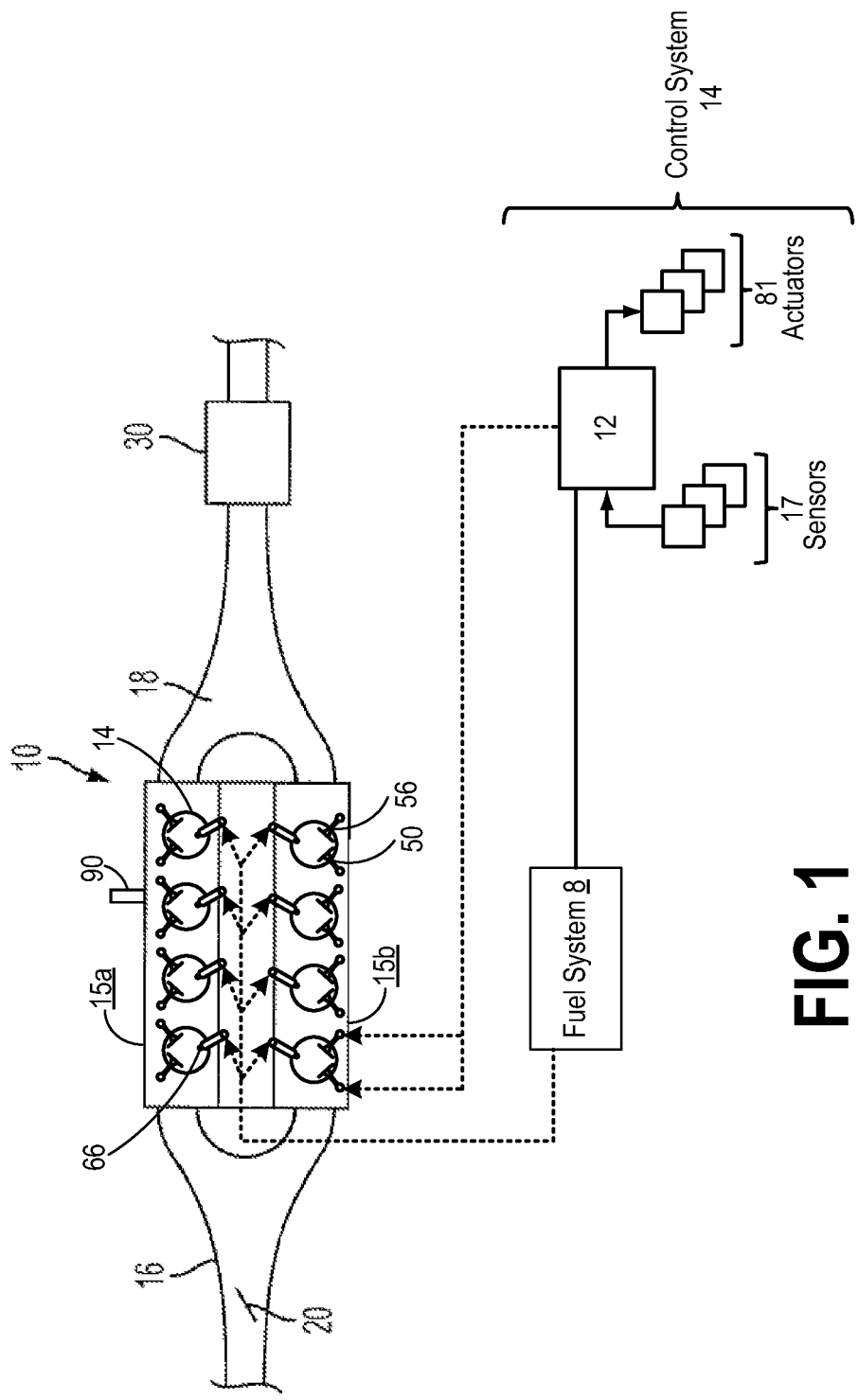
FIG. 1 shows an example embodiment of an engine system layout.
Figure 2:
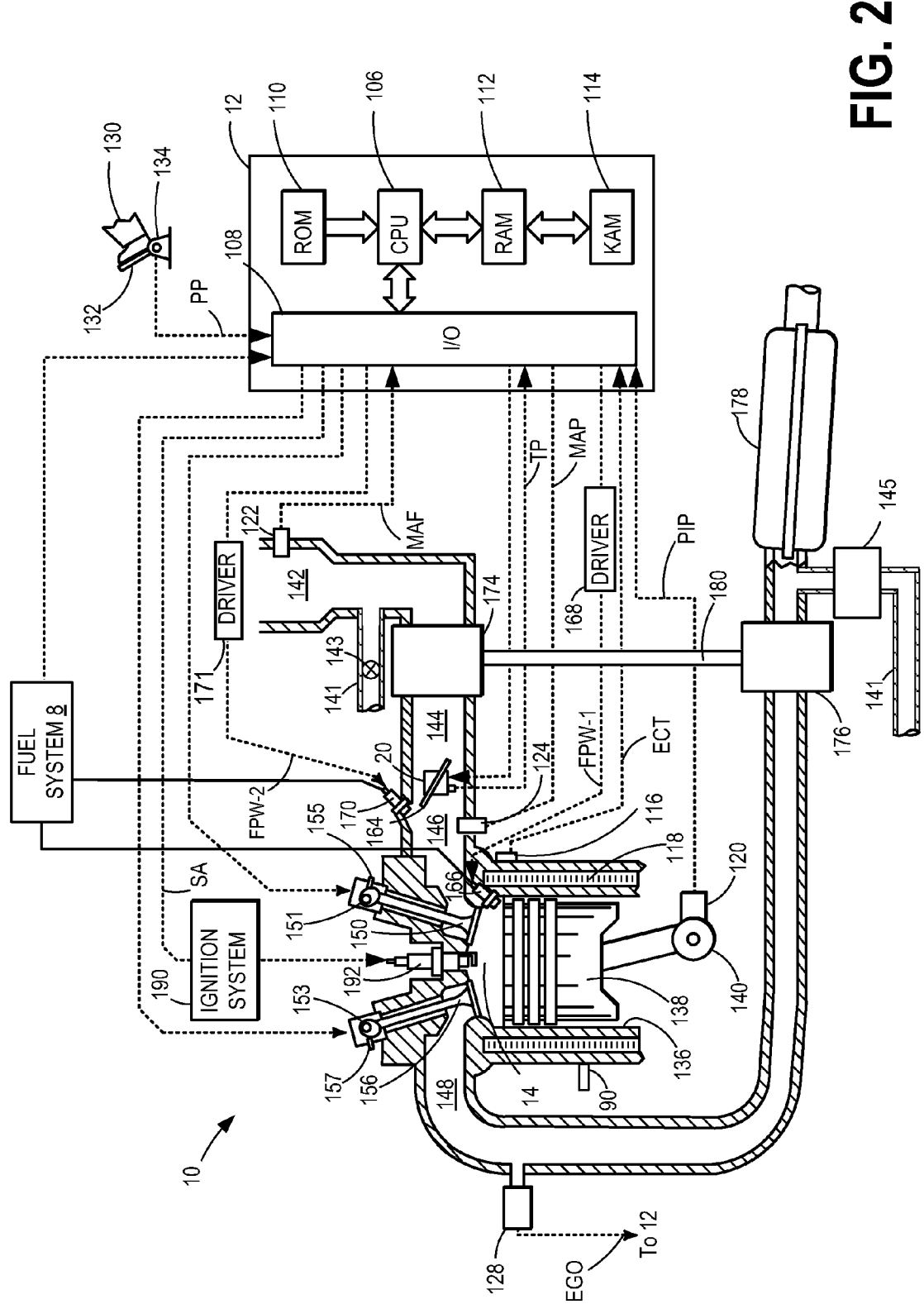
FIG. 2 shows a partial engine view.

Methods and systems are provided for adjusting a fuel injection profile when operating an engine configured for selective cylinder deactivation (herein also referred to as skip-fire operation), such as the engine system of FIGS. 1-2. A controller may select a skip-firing pattern responsive to cylinder knock indications. For example, the controller may be configured to perform routine, such as the routine of FIG. 3, to selectively deactivate a cylinder that is knocking at a higher rate for a duration until the cylinder cools down. Once the cylinder cools down, the cylinder may be reactivated while another cylinder that is now knocking is deactivated. An example adjustment of the cylinder pattern is shown with reference to FIG. 4. In this way, cylinder knock can be reduced while operating with less borderline limited spark.

FIG. 1 shows an example engine 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors.

In some examples, engine system 10 may have selectively deactivatable (direct) fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (or skip-firing) pattern based on a designated control algorithm. More specifically, selected "skipped" working cycles are not fired while other "active" working cycles are fired. Optionally, a spark timing associated with a selected firing of a selected working chamber may also be adjusted based on a firing order or firing history of the selected working chamber. The engine controller 12 may be configured with suitable logic, as described below, for determining a cylinder deactivation (or skip-firing) pattern based on engine operating conditions.

Engine 10 may operate on a plurality of substances, which may be delivered via fuel system 8. Engine 10 may be controlled at least partially by a control system including controller 12. Controller 12 may receive various signals from sensors 17 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of cylinder knock or pre-ignition from one or more knock sensors 90 distributed along the engine block. The plurality of knock sensors 90 may be distributed symmetrically or asymmetrically along the engine block. Further, the one or more knock sensors 90 may include accelerometers, ionization sensors or in-cylinder pressure transducers.

Engine controller may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped.

Since optimal efficiency for a given cylinder is near full output, a lower frequency of firing events may be chosen to reduce output. For example, skipping every other cylinder would produce half of the power, on average. Spacing the firing events out as evenly as possible tends to minimize vibrations due to the varying torque output. Whether all of the cylinders are included in the skip-firing pattern may depend on the fraction of output desired, and other considerations including cylinder temperature.

In this way, by adjusting the cylinder pattern of individual cylinder valve mechanisms and individual cylinder fuel injectors, a desired engine output can be provided by operating fewer cylinders more efficiently, thereby improving fuel economy.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation, pneumatic valve actuation, or hydraulic valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing peak cylinder combustion temperatures and pressures, throttling losses, and NOx emissions. In addition, borderline spark may be advanced towards MBT spark. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

Engine 10 may further include one (as depicted) or more knock sensors 90 distributed along a body of the engine (e.g., along an engine block). When included, the plurality of knock sensors may be distributed symmetrically or asymmetrically along the engine block. Knock sensor 90 may be an accelerometer, an ionization sensor, or a vibration sensor. In one example, the controller 12 may be configured to detect and differentiate engine block vibrations generated due to abnormal combustion events, such as knocking and pre-ignition based on the output (e.g., signal timing, amplitude, intensity, frequency, etc.) of the one or more knock sensors 90. The controller may assess the sensor outputs in different timing windows that are cylinder specific and that are based on the nature of the vibration being detected. For example, abnormal cylinder combustion events due to knock occurring in a firing cylinder may be identified by knock sensor outputs sensed in a window that is after a spark event of the cylinder while abnormal cylinder combustion events due to pre-ignition may be identified by knock sensor outputs sensed in a window that is before a spark event of the cylinder. In one example, the windows in which the knock signals are estimated may be crank angle windows. In addition, the threshold for pre-ignition may be higher than the threshold for knock.

In further examples, the controller 12 may be configured to detect and differentiate the origin of the vibrations based on the output (e.g., signal timing, amplitude, intensity, frequency, etc.) of the one or more knock sensors as well as a rate of change of a parameter indicative of a cylinder aircharge such as a rate of change of a manifold pressure (MAP), a manifold air flow (MAF), etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In this way, the system of FIGS. 1-2 enables a method for an engine comprising: deactivating individual cylinder valve mechanisms according to a cylinder pattern selected based on a knock value of each engine cylinder. By using cylinder deactivation to address cylinder knock, the fuel penalty associated with knock control can be reduced. In addition, cylinders may be operated with spark advanced from borderline towards MBT. This improves engine torque output and fuel economy.

Figure 3:
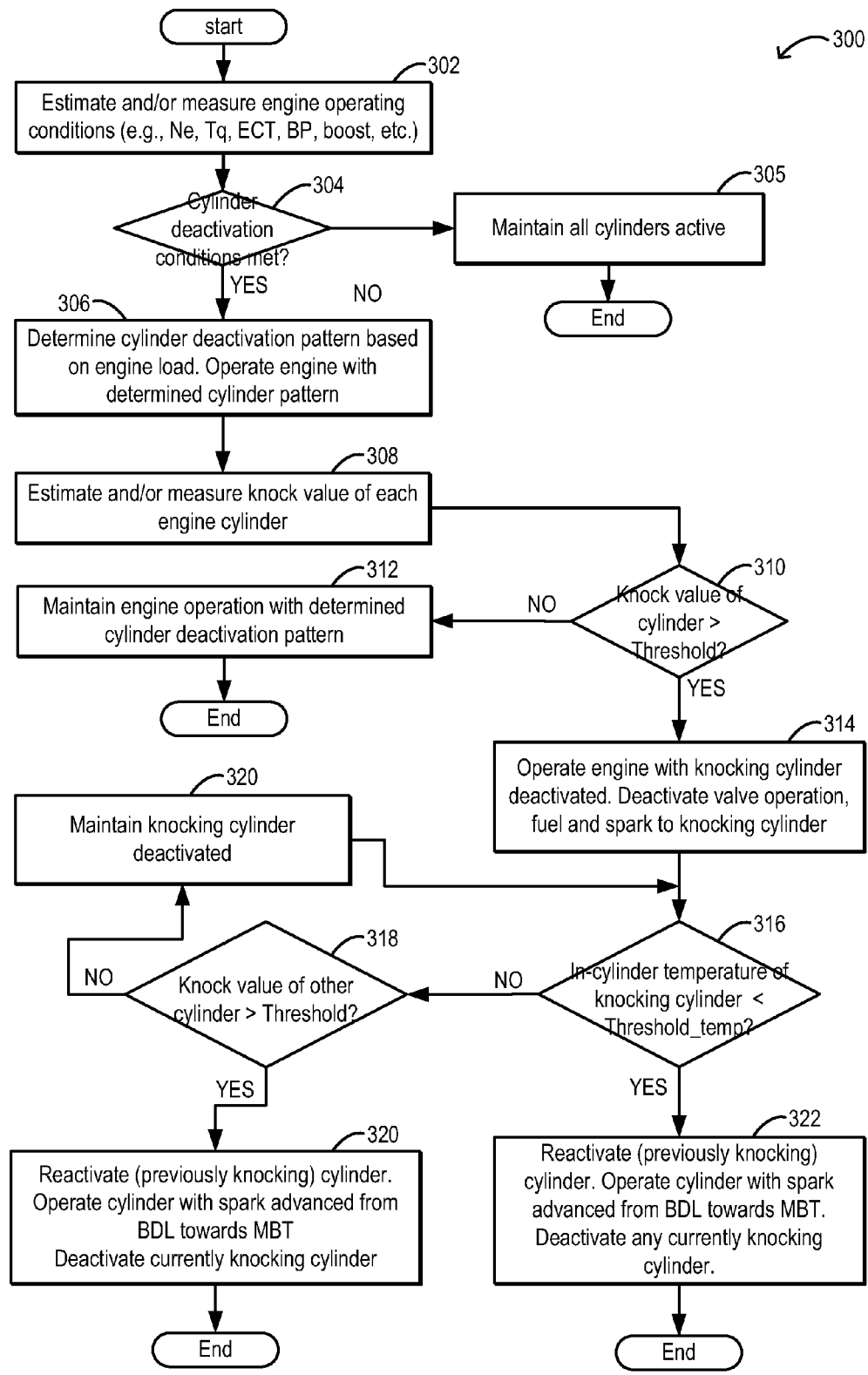
FIG. 3 shows a high level flow chart for adjusting a cylinder pattern for individual cylinder deactivation responsive to cylinder knock occurrence.

FIG. 3 shows an example of routine 300 for adjusting a cylinder deactivation pattern in response to cylinder knock events. The method allows a cylinder deactivation pattern to be selected based on engine load during conditions when the engine is not knock limited, and the cylinder deactivation pattern to be selected based on individual cylinder knock values when the engine is knock limited.

At 302, the routine includes estimating and/or measuring engine operating conditions. The estimated conditions may include, for example, engine speed, driver torque demand, engine temperature, ambient conditions such as ambient temperature and barometric pressure, boost level, etc. At 304, based on the estimated conditions, it may be determined cylinder deactivation conditions have been met. In one example, cylinder deactivation conditions may be considered met if the engine load is lower than a threshold, or driver torque demand is lower than a threshold. If cylinder deactivation conditions are not met, then at 305, the routine includes maintaining all engine cylinders active. If cylinder deactivation conditions are met, then at 306, the controller may select a cylinder pattern based on the engine load.

The cylinder deactivation pattern may be further selected based on one or more of engine speed, vehicle speed, engine temperature, engine NVH, and a transmission gear selection (e.g., whether the engine is currently in a first transmission gear with a first, lower gear ratio or a second transmission gear with a second, higher gear ratio). Determining the cylinder pattern includes determining the number and identity of cylinders to be deactivated, and further determining a duration of the deactivation. For example, the controller may determine a number of combustion events or engine cycles over which to maintain the selected cylinders deactivated. The total number of deactivated/active cylinders may depend on the total actual number of engine cylinders and the driver demand torque. As a non-limiting example, two cylinders may be deactivated for a four cylinder engine, three cylinders may be deactivated for a six cylinder engine, and four cylinders may be deactivated for an eight cylinder engine. In some examples, the same set of cylinders may be selected for deactivation each time cylinder deactivation conditions are met, while in other examples, the identity of the deactivated cylinders may be varied each time cylinder deactivation conditions are met.

In engine systems where cylinders include individual cylinder valve mechanisms coupled to each of a plurality of intake and exhaust valves, the controller may further determine whether to close one or more intake valve mechanisms, one or more exhaust valve mechanisms, or a combination of both during the cylinder deactivation when fuel and spark to the cylinder is ceased. Further, the controller may determine a relative timing of intake and exhaust valve closure for each cylinder selected for deactivation. As an example, the controller may retrieve a pattern from a look-up table stored in the controller's memory. Cylinder patterns may be stored in the look-up table as a function of engine load for the given engine configuration. In one example, at lower engine loads, the cylinder pattern may include the firing of every second or third cylinder. As an example, in an in-line 4 cylinder engine with cylinders labeled 1 through 4 and with a cylinder firing pattern of 1-3-4-2, during regular operating conditions, when no cylinder is deactivated and all cylinders are active, the cylinders may be firing as 134213421342 and so on. In response to cylinder deactivation conditions being met, to provide fuel economy benefits, the controller may shift engine operation to a cylinder pattern where every third cylinder is fired resulting in the pattern 1xx2xx4xx3xx1xx, and wherein x represents a skipped cylinder.

After selecting cylinders for deactivation, the engine may be operated with the selected cylinder pattern. Specifically, the selected cylinders may be deactivated at 306 by holding closed the intake and exhaust valves of the cylinders over at least an entire engine cycle (e.g., two engine crankshaft revolutions). Further, fuel flow and spark supplied to the cylinders being deactivated is ceased while the engine continues to the rotate and while valve, fuel, and spark operation of the remaining active cylinders is maintained. Thus, when cylinder deactivation conditions are met, engine load may be given a higher priority.

At 308, after deactivating the selected cylinders, the method includes estimating and/or measuring a knock value of each engine cylinder. As such, while one or more cylinders are deactivated, the remaining active engine cylinders are operated at a higher average cylinder load. Consequently, one or more of the active cylinders may become hotter and more prone to knock.

In one example, the knock value of each engine cylinder may be determined based on the output of one or more knock sensors coupled along the engine block, or to individual engine cylinders. The knock value of each cylinder may include one or more of a knocking rate of each cylinder, a knock history of each cylinder (e.g., Knock count for the drive cycle), and the output of a knock sensor couple to the engine cylinder.

At 310, it may be determined if the knock value of a cylinder is higher than a threshold value. The threshold knock value may be based on individual cylinder knock history. For example, the knock value of each cylinder may be compared to a knock threshold that is based on the corresponding cylinder's knock history. Then, as the knock history of the cylinder increases (for example, as the knock count of the cylinder over the given drive cycle increases), the threshold value may be lowered. For example, the threshold value may be lowered in response to the spark timing of the cylinder being more retarded from borderline spark. In alternate examples, the knock value of each cylinder may be compared to a common threshold value.

If the knock value of all the cylinders is below the threshold value, that is, none of the cylinders have sufficient knock, then at 312, all the engine cylinders are maintained active. That is, cylinder deactivation is not performed.

If the knock value of any cylinder is above the threshold value, then at 314, the method includes operating the engine would be knocking cylinder(s) deactivated. Specifically, the controller may deactivate individual valve mechanisms of the knocking cylinder as well as disabling fuel and spark to the knocking cylinder. Thus, the controller may deactivate individual cylinder valve mechanisms according to a cylinder pattern selected based on a knock value of each engine cylinder. In one example, the controller may select a first cylinder having a higher than threshold knock value for deactivation while maintaining a second cylinder having a lower than threshold knock value active during the deactivation. The second cylinder is different from the first cylinder. For example, the second cylinder may be next in the firing order relative to the first cylinder. As another example, the second cylinder may be positioned next to the first cylinder on the engine block. In still another example, the second cylinder may be positioned on a different engine bank than the first cylinder.

It will be appreciated that the selecting of a cylinder pattern may be additionally or alternatively further based on a spark timing of each engine cylinder. For example, in response to an indication of knock in a cylinder, a spark ignition timing of the cylinder may be retarded from MBT. If a cylinder is becoming borderline limited, that is, the spark timing of the cylinder has been retarded from MBT to or near borderline spark (BDL), the borderline limited cylinder may be selected for deactivation. Therein, the controller may deactivate a first cylinder having a higher amount of borderline spark while maintaining a second cylinder having a lower amount of borderline spark active during the deactivation. Herein, as above, the second cylinder may be positioned next to the first cylinder on the engine block or may be next in the firing order.

The controller may then maintain the first cylinder deactivated for a number of engines cycles, the number based on a temperature of the first cylinder. As such, when the knocking cylinder is deactivated, the cylinder may start to cool. As the in-cylinder temperature falls, then knocking propensity of the cylinder also falls. Thus, the first cylinder may be maintained deactivated until the in-cylinder temperature falls below a threshold such that cylinder knocking is reduced. The number of engine cycles over which the first cylinder is maintained deactivated may be increased as the temperature of the first cylinder increases above a threshold at the time of cylinder deactivation. After the number of engine cycles has elapsed, the first cylinder may be reactivated.

Additionally, or optionally, as the knocking cylinder starts to cool and another cylinder becomes hotter and more prone to knock (or more borderline limited), the cylinder pattern may be adjusted by reactivating the cooler cylinder (the previously knocking cylinder) while deactivating the hotter cylinder (the currently knocking cylinder), as elaborated below.

At 316, it may be determined if the in-cylinder temperature of the knocking cylinder is below a threshold temperature. That is, it may be determined if the knocking cylinder has cooled sufficiently. If yes, then at 322, the routine includes reactivating the previously knocking cylinder. The reactivated cylinder made then be operated with spark timing advanced from BDL towards MBT. In other words, the cylinder may be operated with more advanced spark on average. This improves the torque output of the cylinder while reducing the fuel penalty associated with knock control of the cylinder. While reactivating the first cylinder, the second cylinder that was active during the deactivation may be deactivated. For example, if the second cylinder has become hotter, more borderline spark limited, or knock limited, then the second cylinder may be deactivated while the first cylinder is reactivated.

If the in-cylinder temperature of the knocking (first) cylinder is not below the threshold temperature, then at 318, it may be determined is the knock value of another cylinder has risen above the threshold value. In one example, while the first cylinder is deactivated, the remaining active engine cylinders are operated at a higher average cylinder load. Consequently, one or more of the active cylinders may become hotter and more prone to knock. In addition, as a knock occurrence in an active cylinder increases, the spark timing of the active cylinder may be gradually retarded resulting in the active cylinder becoming borderline limited. Thus if the knock value of another cylinder rises during the deactivation, at 320, the previously knocking cylinder may be reactivated while the currently knocking cylinder is deactivated. As discussed above, the reactivated cylinder may be operated with spark timing advanced from borderline towards MBT. In one example, the controller may maintain the first cylinder deactivated until one of the knock value of the first cylinder falls below the threshold value, and the knock value of the second cylinder rises above the threshold value. The controller may then reactivate the first cylinder while deactivating the second cylinder.

If the in-cylinder temperature of the knocking cylinder (first cylinder) is not below the threshold temperature (at 316), and further if no other cylinder becomes knock limited while the first cylinder is deactivated (at 318), then at 320, the knocking cylinder is maintained deactivated until one of the conditions of 316 and 318 are met.

As such, engines running on all cylinders to deliver equal torque have higher pumping losses and reduced fuel efficiency. Engines may use cylinder deactivation to reduce pumping losses. However, since they are operated at higher load, they may typically become borderline limited. By adjusting which cylinders are maintained active and which cylinders are deactivated based on individual cylinder knock incidence, the active cylinders are allowed to intermittently cool and become less borderline limited. By enabling them to be operated with more advanced spark output (spark timing closer to MBT), cylinder operation is made more efficient resulting in reduced fuel consumption.

Figure 4:
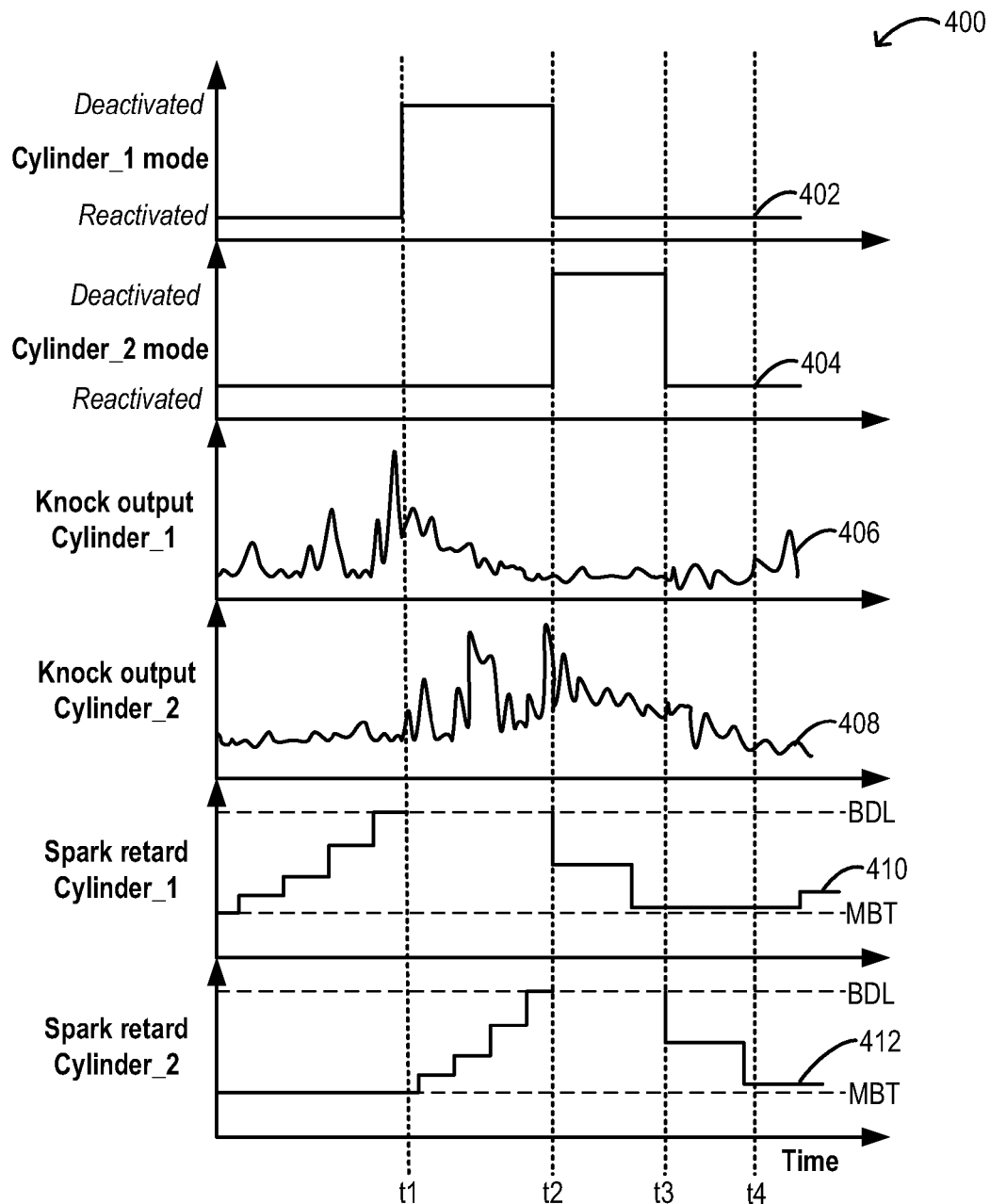
FIG. 4 shows an example cylinder deactivation adjustment used to control engine knock with improved fuel economy.

Turning now to FIG. 4, map 400 depicts an example adjustment of a cylinder deactivation pattern responsive to cylinder knock. Map 400 detects the operating mode (deactivated or reactivated) of a first cylinder (cylinder_1) at plot 402, the operating mode of a second cylinder (cylinder_2) at plot 404, the knock value of the first cylinder at plot 406, the knock value of the second cylinder at plot 408, spark retard in the first cylinder at plot 410, and spark retard in the second cylinder at plot 412. All plots are shown over time along the X axis.

Prior to t1, the engine may be operating with all cylinders active. Between t0 and t1, the knock value of the second cylinder may be lower than a threshold. For example, the second cylinder may not be knocking. At the same time, the first cylinder may be intermittently knocking as shown by the intermittent increases in the knock value of the first cylinder.

Accordingly, spark timing of the second cylinder may be maintained substantially at MBT. In comparison, spark timing of the first cylinder may be gradually moved towards BDL as knocking frequency increases. By t1, the first cylinder may be knock limited and borderline spark limited.

At t1, the first cylinder may be selectively deactivated while the second cylinder is maintained active. Due to the cylinder deactivation, the first cylinder may start to cool and the knock output of the first cylinder they start to drop such that by t2, where cylinder is not knock limited anymore. Concurrently, due to the second cylinder operating with a higher average cylinder load, the second cylinder may become hotter and the knock output of the second cylinder may start to rise. As a result, between t1 and t2, the spark timing of the second cylinder may be gradually retarded from MBT towards BDL such that at t2, the second cylinder is knock limited.

At t2, in response to the second cylinder becoming borderline spark limited, the first cylinder may be reactivated while the second cylinder is deactivated. In addition, the reactivated first cylinder may be operated with spark timing advanced from BDL towards MBT. By t3, the spark timing of the first cylinder may have been advanced closer to MBT.

Between t2 and t3, the second cylinder is maintained deactivated until it sufficiently cools. At t3, in response to the lower knock value of the second cylinder, the second cylinder may be reactivated. In addition, the reactivated second cylinder may be operated with spark timing advanced from BDL towards MBT. By t4, the spark timing of the second cylinder may have been advanced closer to MBT. In this way, a controller may deactivate a first cylinder in response to an indication of knock in the first cylinder; and reactivate the first cylinder in response to an indication of knock in a second cylinder. Further, the controller may deactivate the second cylinder while reactivating the first cylinder in response to the indication of knock in the second cylinder. Deactivating the first or second cylinder includes deactivating individual cylinder valve mechanisms while disabling cylinder fuel and spark. The controller may further maintain the second cylinder deactivated for a number of engine cycles based on an in-cylinder temperature of the second cylinder, the number of engine cycles increased as the in-cylinder temperature of the second cylinder, estimated at a time of second cylinder deactivation, increases. The controller may be further configured to, after the in-cylinder temperature of the second cylinder falls below a threshold, reactivate the second cylinder while deactivating the first cylinder, the threshold adjusted based on a knock history of the second cylinder. In one example, the deactivating is performed while engine load is below a threshold load or driver demanded torque is below a threshold torque.

In another example, an engine system comprises a first and a second engine cylinder, each of the first and second engine cylinder including electrically actuated intake and exhaust values; a knock sensor for sensing knock in each of the first and second cylinder; a first and second temperature sensor for sensing an in-cylinder temperature of the first and second cylinder, respectively; and a controller. The controller may be configured with computer readable instructions stored on non-transitory memory for: in response to a knock value of the first cylinder being higher than a first threshold while a knock value of the second cylinder is lower than a second threshold, deactivating the first cylinder for a number of combustion events until one of an in-cylinder temperature of the first cylinder is lower than a threshold temperature and the knock value of the second cylinder is higher than the second threshold; and reactivating the first cylinder while deactivating the second cylinder. Herein, the first threshold is based on a knock frequency of the first cylinder, the first threshold decreased as the knock frequency of the first cylinder increases, and the second threshold is based on a knock frequency of the second cylinder, the second threshold decreased as the knock frequency of the second cylinder increases. The controller may include further instructions for, while deactivating the first cylinder, advancing spark timing of the second cylinder towards MBT, and while deactivating the second cylinder, advancing spark timing of the first cylinder towards MBT.

In this way, the technical effect of adjusting an identity of cylinders selected for individual deactivation based on their knock history is that cylinder knock may be addressed with reduced spark retard. In particular, active cylinders may be operated with more advanced spark output (closer to MBT). By varying the active cylinders so as to enable them to be cooled between operations allows them to become less borderline limited. By reducing the knock propensity of active cylinders when operating an engine with cylinder deactivation, the fuel economy benefits of cylinder deactivation may be extended. In addition, further fuel economy benefits may be achieved by addressing cylinder knock with overall less spark retard and by operating active engine cylinders with more advanced spark on average.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
with a controller, executing computer readable instructions stored in non-transitory memory to deactivate individual cylinder valve mechanisms according to a cylinder pattern selected based on a knock value of each engine cylinder, wherein the selecting includes selecting a first cylinder having a higher than threshold knock value for deactivation while maintaining a second cylinder having a lower than threshold knock value active during the deactivation.

2. The method of claim 1, wherein the selecting is further based on a spark timing of each engine cylinder.

3. The method of claim 1, wherein the knock value of each cylinder includes one or more of an output of a knock sensor coupled to each cylinder, a knocking rate, and a knock history of each cylinder.

4. The method of claim 1, wherein the threshold knock value is based on cylinder knock history.

5. The method of claim 1, wherein the selected cylinder pattern includes deactivating the first cylinder having a higher amount of borderline spark while maintaining the second cylinder having a lower amount of borderline spark active during the deactivation.

6. The method of claim 1, further comprising, with the controller, executing computer readable instructions stored in non-transitory memory to maintain the first cylinder deactivated for a number of engine cycles, the number based on a temperature of the first cylinder, the number of engine cycles increased as the temperature of the first cylinder increases above a threshold, wherein the temperature of the cylinder includes a measured or inferred in-cylinder temperature.

7. The method of claim 6, further comprising, with the controller, executing computer readable instructions stored in non-transitory memory to reactivate the first cylinder after the number of engine cycles has elapsed.

8. The method of claim 7, further comprising, with the controller, executing computer readable instructions stored in non-transitory memory to deactivate the second cylinder while reactivating the first cylinder.

9. The method of claim 6, further comprising, with the controller, executing computer readable instructions stored in non-transitory memory to maintain the first cylinder deactivated until the temperature of the first cylinder falls below a threshold temperature, and the knock value of the second cylinder rises above the threshold knock value, and then, reactivate the first cylinder while deactivating the second cylinder.

10. A method for an engine, comprising:
with a controller, executing computer readable instructions stored in non-transitory memory to:
deactivate a first cylinder in response to an indication of knock in the first cylinder; and
reactivate the first cylinder in response to an indication of knock in a second cylinder.

11. The method of claim 10, further comprising, with the controller, executing computer readable instructions stored in non-transitory memory to deactivate the second cylinder while reactivating the first cylinder in response to the indication of knock in the second cylinder.

12. The method of claim 11, wherein deactivating the first or second cylinder includes deactivating individual cylinder valve mechanisms while disabling cylinder fuel and spark.

13. The method of claim 11, further comprising, with the controller, executing computer readable instructions stored in non-transitory memory to maintain the second cylinder deactivated for a number of engine cycles based on an in-cylinder temperature of the second cylinder, the in-cylinder temperature estimated by a temperature sensor or inferred based on in-cylinder conditions.

14. The method of claim 13, further comprising, with the controller, executing computer readable instructions stored in non-transitory memory to increase the number of engine cycles as the in-cylinder temperature of the second cylinder, estimated at a time of second cylinder deactivation, increases.

15. The method of claim 14, further comprising, with the controller, executing computer readable instructions stored in non-transitory memory to, after the in-cylinder temperature of the second cylinder falls below a threshold, reactivate the second cylinder while deactivating the first cylinder, the threshold adjusted based on a knock history of the second cylinder.

16. The method of claim 10, wherein the deactivating is performed while engine load is below a threshold load or driver demanded torque is below a threshold torque.

17. An engine system, comprising:
a first and a second engine cylinder, each of the first and second engine cylinders including independently actuated intake and exhaust valves;
a knock sensor for sensing knock in each of the first and second cylinders;
a first and a second temperature sensor for estimating an in-cylinder temperature of the first and the second cylinder, respectively; and
a controller with computer readable instructions stored in non-transitory memory for:
in response to a knock value of the first cylinder being higher than a first threshold while a knock value of the second cylinder is lower than a second threshold, deactivating the first cylinder for a number of combustion events until one of the in-cylinder temperature of the first cylinder is lower than a threshold temperature and the knock value of the second cylinder is higher than the second threshold; and
reactivating the first cylinder while deactivating the second cylinder.

18. The system of claim 17, wherein the first threshold is based on a knock frequency of the first cylinder, the first threshold decreased as the knock frequency of the first cylinder increases, and wherein the second threshold is based on a knock frequency of the second cylinder, the second threshold decreased as the knock frequency of the second cylinder increases.

19. The system of claim 18, wherein the controller includes further instructions for, while deactivating the first cylinder, advancing spark timing of the second cylinder towards MBT, and while deactivating the second cylinder, advancing spark timing of the first cylinder towards MBT.

* * * * *